United States Statutory Invention Registration [19]

[11] Reg. Number: H916

Nishida [43] Published: May 7, 1991

[54] THERMOPLASTIC RESIN COMPOSITION

[75] Inventor: Kozi Nishida, Toyama, Japan

[73] Assignee: Mitsubishi Rayon Company Limited, Tokyo, Japan

[21] Appl. No.: 378,766

[22] Filed: Jul. 12, 1989

[30] Foreign Application Priority Data

Jul. 29, 1988 [JP] Japan ..... 63-191566

[51] Int. Cl.[5] ..... C08G 63/48
[52] U.S. Cl. ..... 525/66; 525/64
[58] Field of Search ..... 525/64

[56] References Cited

U.S. PATENT DOCUMENTS

| | | | |
|---|---|---|---|
| 2,146,209 | 2/1939 | De Witt . | |
| 4,246,374 | 1/1981 | Kopchik | 525/329 |
| 4,500,679 | 2/1985 | Dufour | 525/64 |
| 4,727,117 | 2/1988 | Hallden-Abberton et al. | 525/343 |
| 4,745,159 | 5/1988 | Anzai et al. | 525/329.9 |

FOREIGN PATENT DOCUMENTS 59-049252 3/1984 Japan .

*Primary Examiner*—John S. Maples
*Assistant Examiner*—Shean C. Wu
*Attorney, Agent, or Firm*—Braumbaugh, Graves, Donohue & Raymond

[57] ABSTRACT

A thermoplastic resin composition, comprising:

(A) 20–95% by weight of a methacrylimide group-containing resin polymer containing at least 5% by weight of an imide ring structural unit expressed by the structural formula (I)

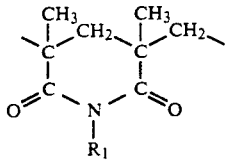

(I)

(wherein $R_1$ is a hydrogen atom or a substituted or non-substituted alkyl group having 1–20 carbon atoms, cycloalkyl group, aryl group, alkaryl group or an aralkyl group or allyl group);

(B) 2.5–30% by weight of at least one thermoplastic elastomer selected from the group consisting of polyether esters, polyether ester amides and polyether amides; and (C) 2.5–50% by weight of a graft-copolymer obtained by graft-polymerizing at least one monomer selected from the group consisting of vinyl cyanate monomer, aromatic vinyl monomer and acrylic vinyl monomer to a butadiene rubber, is disclosed. This composition has balanced properties in heat resistance, impact strength and moldability.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMOPLASTIC RESIN COMPOSITION

BACKGROUND OF THE INVENTION

1. Field of the Invention

This invention relates to a thermoplastic resin composition which has a high heat distortion temperature along with excellent impact resistance and moldability.

2. Description of the Prior Art

The methacrylimide group-containing polymer is known as a thermoplastic resin polymer with excellent properties in heat resistance and transparency (U.S. Pat. No. 4,246,374). However, its application as a molding material is considerably restricted due to inferior mechanical properties including impact strength.

Many attempts have been made to eliminate the drawbacks of the methacrylimide group-containing polymer, proposing various methods including, for example, [1] a method of blending acrylonitrile-butadiene-styrene copolymer (ABS resin), methyl methacrylate-butadiene-styrene copolymer (MBS resin) or alkyl acrylate rubber as an impact modifier (Laid-Open Japanese Patent Application 52-63989), [2] a method of blending a butadiene rubber- or alkyl acrylate rubber-base multi-stage polymer in combination with polycarbonate as an impact modifier (Laid-Open Japanese Patent Application 55-80459), and [3] a method of blending a butadiene rubber-base multi-stage polymer in combination with an alkyl acrylate rubber-base multi-stage polymer as an impact modifier.

Nevertheless, the impact strength obtained by the methods [1] and [3] mentioned above are still insufficient. Namely, it is necessary to blend the impact modifier in a large quantity to secure a higher impact strength. This, however, sacrifices the heat resistance inherent to the methacrylimide group-containing polymer as well as its fluidity in molding. On the other hand, the method [2] which intends to improve the impact strength while retaining the molding fluidity fails to produce the intended effects to a sufficient degree because the methacrylimide group-containing polymer has low compatibility with polycarbonate by nature.

For solving these problems, a proposal has been made with regard to an attempt of improving the impact strength by blending the methacrylimide group-containing polymer with a specific thermoplastic elastomer selected from polyether ester, polyether ester amide and polyether amide (Laid-Open Japanese Patent Application 59-49252). Although it is possible to improve the impact strength and molding fluidity by this method, the inherent heat resistance of the methacrylimide group-containing polymer has to be sacrificed to enhance the impact strength further.

Under these circumstances, researches have been conducted with a view to increase the impact strength of the methacrylimide group-containing polymer and to improve the moldability without impairing its inherent heat resistance, and as a result it has been found that these objectives can be attained by blending a specific thermoplastic elastomer and a specific butadiene rubber graft-copolymer with the methacrylimide group-containing polymer.

SUMMARY OF THE INVENTION

According to the present invention, there is provided a thermoplastic resin composition, comprising:

(A) 20–95% by weight of a methacrylimide group-containing polymer containing at least 5% by weight of an imide ring structural unit expressed by the structural formula (I)

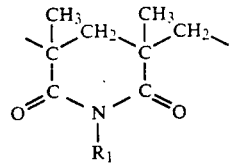

(I)

(wherein $R_1$ is a hydrogen atom or a substituted or non-substituted alkyl group having 1–20 carbon atoms, cycloalkyl group, aryl group, alkaryl group or an aralkyl group or allyl group);

(B) 2.5–30% by weight of at least one thermoplastic elastomer selected from the group consisting of polyether ester, polyether ester amide and polyether amide;

(C) 2.5–50% by weight of a graft-copolymer obtained by graft-polymerizing at least one monomer selected from the group consisting of vinyl cyanate monomer, aromatic vinyl monomer and acrylic monomer to a butadiene rubber.

DESCRIPTION OF THE PREFERRED EMBODIMENTS

For preparing the methacrylimide group-containing polymer in the present invention, it is useful to employ a method of reacting a methacrylic resin and ammonia or a primary amine (hereinafter ammonia and primary amine will be referred to as "an imidizing agent" for brevity) under an inert gas atmosphere and in an inert solvent at a temperature of 180°–350° C., preferably at a temperature of 200°–330° C. Nitrogen gas is useful as the inert gas, and the inert solvent is preferred to be a solvent or a mixture of two or more solvents, which is capable of dissolving the methacrylic resin of the starting material and the methacrylimide group-containing polymer to be produced. Examples of useful solvents include aromatic hydrocarbons such as benzene, toluene and xylene, and aliphatic alcohols such as methanol, ethanol and propanol.

In the imide ring structural unit mentioned above, $R_1$ is a hydrogen atom or a substituted or non-substituted alkyl group having 1–20 carbon atoms, cycloalkyl group, aryl group, alkaryl group or an aralkyl group or allyl group. Among these, a hydrogen atom, a methyl group, an ethyl group, a t-butyl group, a cyclohexyl group and a phenyl group are preferred. Examples of the imidizing agent for obtaining the imide ring structural unit include ammonia, methylamine, ethylamine, t-butylamine and cyclohexylamine.

The methacrylimide group-containing polymer in the present invention should contain at least 5% by weight of the imide ring structural unit, preferably in a proportion greater than 20% by weight. When the content of the imide ring structural unit content is less than 5% by weight, heat resistance of the imide polymer is low.

Examples of the methacrylic resins useful in the present invention for the preparation of the methacrylimide group-containing polymer include homopolymer of methyl methacrylate, and copolymers of methyl methacrylate and other methacrylic acid esters, acrylic acid esters, styrene, α-methylstyrene and acrylonitrile.

Examples of other methacrylic acid esters include ethyl methacrylate, propyl methacrylate, n-butyl methacrylate, isobutyl methacrylate, t-butyl methacrylate, cyclohexyl methacrylate and benzyl methacrylate. Examples of other acrylic acid esters include methyl acrylate, ethyl acrylate, propyl acrylate, n-butyl acrylate, isobutyl acrylate, t-butyl acrylate, cyclohexyl acrylate and benzyl acrylate.

As the methacrylic resin to be used for the preparation of the methacrylimide group-containing polymer, methyl methacrylate homopolymer, methyl methacrylate-methyl acrylate copolymer, methyl methacrylate-styrene copolymer are especially preferred. Although there is no restriction in particular, the content of methyl methacrylate in these copolymers is preferred to be greater than 70% by weight.

The content of the methacrylimide group-containing polymer in the thermoplastic resin composition according to the present invention is in the range of 20–95% by weight. If its content is smaller than 20% by weight, it becomes difficult to produce a resin composition with excellent heat resistance. Conversely, if greater than 95% by weight, the resulting resin composition is not expected to have excellent mechanical properties.

The thermoplastic elastomer to be used in the present invention includes at least one thermoplastic elastomer selected from the group consisting of polyether ester, polyether ester amide and polyether amide. of which polyether ester is especially preferable. The "polyether ester" preferably used includes a block copolymer containing polyester with a number average molecular weight of 1,000–60,000 having more than 80 mol % of its repetitive unit constituted by an alkylene terephthalate unit as a hard segment, and poly (alkyleneoxide) glycol with a number average molecular weight of 400–6,000 having more than 80 mol % of its repetitive unit constituted by an alkylene oxide unit as a soft segment. The content of the poly (alkyleneoxide) glycol component in the block-copolymer is preferably in the range of 1–85% by weight, more preferably in the range of 5–50% by weight. Examples of the polyether ester block-copolymers include polyethylene terephthalate-polyethylene oxide block-copolymer, polyethylene terephthalate-polytetramethylene oxide block-copolymer, polytetramethylene terephthalate-polyethylene oxide block-copolymer, and polytetramethylene terephthalate-polytetramethylene oxide block-copolymer. The "polyether ester amide" and "polyether amide" include block-copolymers which contain polyether as a soft segment and polyester amide or polyamide as a hard segment, which can be produced by known processes (Laid-Open Japanese Patent Application 59-49252).

The content of the thermoplastic elastomer in the thermoplastic resin composition according to the present invention should be in the range of 2.5–30% by weight because it becomes difficult to obtain a resin composition with the excellent mechanical properties when its content is smaller than 2.5% by weight. When its content is greater than 30% by weight, a difficulty is encountered in obtaining a resin composition which is excellent in balance of the mechanical properties and the heat resistance.

The graft-copolymer useful in the present invention is a graft-copolymer which is produced by graft-polymerizing at least one monomer selected from the group consisting of cyanated vinyl monomer, aromatic vinyl monomer and acrylic vinyl monomer to a butadiene rubber. Specific examples of such graft-copolymers include acrylonitrile-butadiene-styrene copolymer (ABS resin), methyl methacrylate-butadiene-styrene copolymer (MBS resin) and graft-copolymers of acrylonitrile and styrene to ethylene-propylene-diene rubber (AES resin).

The content of the above-described graft-copolymer in the thermoplastic resin composition of the invention is in the range of 2.5–50% by weight. If its content is less than 2.5% by weight, production of a resin composition with excellent mechanical properties becomes difficult, and, if in excess of 50% by weight, it is difficult to obtain a resin composition which has excellent balance in the heat resistance and mechanical properties.

A thermoplastic resin composition of the present invention may be admixed with other polymers for the purpose of adjusting the resin composition to secure desired properties.

In the present invention, the methacrylimide group-containing polymer (A), thermoplastic elastomer (B) and graft-copolymer (C) can be blended by melting and mixing the respective components with granular, powdery or chip shape in a V-type blender, super mixer or kneader, and then molding them.

In order to improve the resistance to heat, rays of light, and oxidative deteriorations, the thermoplastic resin composition of the present invention may be added with a heat stabilizer, an antioxidant, an ultraviolet ray absorbent or the like. Further. a plasticizer, a pigment, a lubricant or the like may be blended into the composition if desired. Fibrous material such as glass fibers and carbon fibers may also be added for the purpose of reinforcement.

The thermoplastic resin composition of the present invention can be formed into articles of various shapes by compression molding, injection molding, extrusion molding or other known plastics molding processes.

EXAMPLES

The present invention will now be described in more detail with reference to Examples, but the present invention is not limited to them.

In the following Examples, the units "part" and "%" indicate "part by weight" and "percentage by weight", respectively, unless otherwise indicated.

The physical properties of the polymers in Examples were measured by the following methods.

(1) The heat distortion temperature was measured according to ASTM D648 (load: 18.6 kg/cm$^2$).

(2) Izod impact strength was measured according to ASTM D256-56 Method A.

(3) The melt index was determined according to ASTM D1238 (grams for 10 minutes at 260° C. under a load of 10 kg).

(4) The imidizing degree (mol %) of the methacrylimide group-containing polymer was measured from the nitrogen content obtained from the elementary analysis (using a CHN corder (MT-3), a product of Yanagimoto Seisakusho K.K.) and from the measurement by proton NMR JNM-FX-100 (JEOL) spectrometer at 100 MHz.

(5) The intrinsic viscosity of the polymer was determined by measuring the flow time (ts) of sample polymer solutions in chloroform in different polymer concentration and the flow time (to) of chloroform at the temperature of 25° C.±0.1° C. with use of Deereax-Bishoff viscometer, calculating the relative viscosity $\eta rel$ of the polymer from the value of ts/to, and calculating the value of intrinsic viscosity according to the following formula.

$$\text{Intrinsic viscosity} = \lim_{C \to 0} (\ln \eta rel)/C(dl/g)$$

(wherein C is the grams of the polymer per 100 ml of solvent.)

REFERENTIAL EXAMPLE A

Preparation of Methacrylimide Group-containing Polymer

REFERENTIAL EXAMPLE A-1

100 parts of sufficiently dried methyl methacrylate polymer (Acrypet ®VH, a product of Mitsubishi Rayon Co., Ltd. with an intrinsic viscosity of 0.51), 90 parts of toluene and 10 parts of methanol were put in a 10l reactor with a paddle spiral stirrer, pressure gauge, sample injection vessel and jacket heater, and, after sufficient replacement by nitrogen, the mixture was heated to 250° C. with stirring to dissolve the polymer. Then, 21.7 parts of methylamine (0.7 in molar ratio) were added from the sample injection vessel, and the reaction was effected for 3 hours with heating under an internal pressure of 60 kg/cm$^2$ in gauge pressure. Upon completion of the reaction, the methacrylimide group-containing polymer A-1 was obtained.

REFERENTIAL EXAMPLE A-2

The procedures in Referential Example A-1 were repeated except that ammonia was used in place of methylamine in an amount corresponding to a molar ratio of 0.8, obtaining the methacrylimide group-containing polymer A-2 after the reaction.

Table 1 below shows the results of measurements of the imidization degree and heat distortion temperatures of the polymers A-1 and A-2.

TABLE 1

| Polymers A | Imidizing Agent Kind | Imidizing Agent Molar Ratio | Imidization Degree (mol %) | Heat Distortion Temperature (°C.) |
|---|---|---|---|---|
| A-1 | Methylamine | 0.7 | 70 | 150 |
| A-2 | Ammonia | 0.8 | 75 | 197 |

REFERENTIAL EXAMPLE B

Preparation of thermoplastic elastomer (Elastomers were prepared in accordance with Examples of Laid-Open Japanese Patent Application 59-49252)

REFERENTIAL EXAMPLE B-1

Preparation of polyether ester block copolymer 94.5 parts of dimethyl terephthalate, 41.5 parts of dimethyl isophthalate, 38.5 parts of poly (tetramethyleneoxide) glycol with a number average molecular weight of about 1000 and 94.5 parts of 1,4-butandiol were charged into a reactor with a helical ribbon type stirrer, along with 0.1 part of titanium tetrabutoxide catalyst, and heated at 210° C. for 2 hours while distilling 95% of the theoretical amount of methanol out of the system. 0.42 parts of "Irganox 1010" (an antioxidant produced by Chiba Geigy Co., Ltd.) was then added to the reaction mixture and the temperature was raised to 245° C., thereafter depressurizing the system to 0.2 mmHg over a time length of 50 minutes and conducting the polymerization for 2 hours under these conditions to obtain a polyether ester block-copolymer.

REFERENTIAL EXAMPLE B-2

Preparation of polyether ester amide block-copolymer 54.6 parts of ω-aminododecanoic acid, 13.4 parts of dodecanedioic acid and 38.7 parts of poly (tetramethyleneoxide) glycol with a number average molecular weight of 663 were charged into a reactor with a helical ribbon type stirrer along with 0.2 parts of "Irganox 1098" (an antioxidant produced by Chiba Geigy Co., Ltd.) and 0.05 parts of tetrabutyl titanate catalyst, and, after sufficient replacement by nitrogen, the charged mixture was heated at 220° C. with stirring for 30 minutes, obtaining a uniform transparent solution. The solution was then subjected to reaction for 5 hours and 30 minutes under a polymerization condition of 250° C. and 1 mmHg to obtain a molten polymer of a colorless transparent polyether ester amide block copolymer.

REFERENTIAL EXAMPLE B-3

Preparation of polyether amide block-copolymer 136 parts of ε-caprolactam, 38.5 parts of poly (tetramethyleneoxide) glycol with a number average molecular weight of about 1000 and 94.5 parts of 1,4-butadiol were charged into a reactor with a helical ribbon type stirrer along with 0.1 part of titanium tetrabuthoxide catalyst, and subjected to reaction under the same conditions as in Referential Example B-2, obtaining a polyether amide block copolymer.

REFERENTIAL EXAMPLE C

Preparation of Graft-Copolymer

REFERENTIAL EXAMPLE C-1

Preparation of acrilonitrile-butadiene-styrene copolymer (ABS resin)

80 parts of polybutadiene latex (with solid content of 50%, average particle size of 0.35μ and gel content of 90%), 1 part of sodium stearate, 0.1 part of sodium formaldehyde sulfoxylate, 0.03 parts of tetrasodium ethylenediaminetetraacetic acid, 0.003 parts of ferrous sulfate and 200 parts of water were charged into a reactor, and heated to 65° C., then adding, continuously over a time length of 4 hours, 60 parts of a monomer mixture consisting of 30% of acrylonitrile and 70% of styrene, 0.3 parts of t-dodecylmercaptan and 0.2 parts of cumene hydroperoxide. After the addition, the polymerization was conducted at 65° C. for 2 hours. Polymerization degree was 96%. After adding an antioxidant to latex, the latex was coagulated with sulfuric acid, and washed with water and dried to obtain a powdery acrylonitrile-butadiene-styrene copolymer.

REFERENTIAL EXAMPLE C-2

Preparation of methyl methacrylate-butadiene-styrene copolymer (MBS resin)

The procedures of Referencial Example C-1 were repeated for the reaction except that 60 parts of a monomer mixture of 70% methyl methacrylate and 30% styrene was used in place of 60 parts of the monomer mixture of acrylonitrile and styrene, finally obtaining a powdery methyl methacrylate-butadiene-styrene copolymer.

EXAMPLES 1-10 & COMPARATIVE EXAMPLES 1-5

The methacrylimide group-containing polymers A-1 and A-2 prepared in Referential Examples A, the thermoplastic elastomers B-1 to B-3 prepared in Referential Examples B, and the graft-copolymers C-1 and C-2 prepared in Referential Examples C were blended in the proportions as indicated in Table 2, and each one of the resulting resin compositions was melted and extruded into pellets by an extruder. The pellets were molded by injection molding to obtain specimens for measurement of physical properties. The results of the measurement of physical properties of these specimens are also shown in Table 2.

As clear from Table 2, specimens obtained in Examples 1 to 10 are excellent in the heat distortion temperature, Izod impact strength and fluidity in a balanced fashion, while in the cases where the methacrylimide group-containing polymer alone was used (Comparative Examples 3 and 4), and where the methacrylimide group-containing polymer and the thermoplastic elastomer or the graft-copolymer were used at a blending ratio outside the range of the invention (Comparative Examples 1, 2 and 5), only specimens having insufficient either in Izod impact strength or in fluidity can be obtained.

TABLE 2

| | Blending ratio | | | | | | Heat Distortion Temp. | Izod Impact Strength | Melt Index |
|---|---|---|---|---|---|---|---|---|---|
| | Polymers A | | Thermoplastic Elastomers B | | Graft-Copolymers C | | | | |
| | Type | Part | Type | Part | Type | Part | (°C.) | (kg · cm/cm²) | (g/10 min.) |
| Example | | | | | | | | | |
| 1 | A-1 | 70 | B-1 | 15 | C-1 | 15 | 135 | 23 | 18 |
| 2 | A-1 | 70 | B-2 | 15 | C-1 | 15 | 137 | 20 | 17 |
| 3 | A-1 | 70 | B-3 | 15 | C-1 | 15 | 139 | 17 | 17 |
| 4 | A-1 | 70 | B-1 | 15 | C-2 | 15 | 136 | 18 | 17 |
| 5 | A-1 | 70 | B-2 | 15 | C-2 | 15 | 138 | 16 | 16 |
| 6 | A-1 | 70 | B-3 | 15 | C-2 | 15 | 140 | 15 | 16 |
| 7 | A-2 | 70 | B-1 | 15 | C-1 | 15 | 170 | 10 | 8 |
| 8 | A-1 | 80 | B-1 | 10 | C-1 | 10 | 143 | 13 | 10 |
| 9 | A-1 | 60 | B-1 | 15 | C-1 | 25 | 130 | 27 | 20 |
| 10 | A-1 | 50 | B-1 | 15 | C-1 | 35 | 125 | 30 | 25 |
| Compar. Ex. | | | | | | | | | |
| 1 | A-1 | 70 | B-1 | 30 | — | | 130 | 6 | 15 |
| 2 | A-1 | 70 | — | | C-1 | 30 | 135 | 9 | 13 |
| 3 | A-1 | 100 | — | | — | | 150 | 1 | 8 |
| 4 | A-2 | 100 | — | | — | | 197 | 1 | 3 |
| 5 | A-1 | 96 | B-1 | 2 | C-1 | 2 | 147 | 2 | 10 |

What we claim:

1. A thermoplastic resin composition, comprising:

(A) 20–95% by weight of a methacrylimide group-containing polymer containing at least 5% by weight of an imide ring structural unit expressed by the structural formula (I)

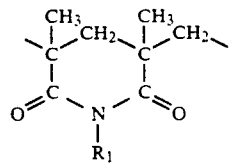

(I)

(wherein $R_1$ is a hydrogen atom or a substituted or non-substituted alkyl group having 1–20 carbon atoms, cycloalkyl group, aryl group, alkaryl group or an aralkyl group or allyl group);

(B) 5–30% by weight of at least one thermoplastic elastomer selected from the group consisting of polyether esters, polyether ester amides and polyether amides; and (C) 2.5–50% by weight of a graft-copolymer obtained by graft-polymerizing at least one monomer selected from the group consisting of vinyl cyanate monomer, aromatic vinyl monomer and acrylic monomer to a butadiene rubber.

2. A thermoplastic resin composition as claimed in claim 1 wherein the thermoplastic elastomer of the component (B) is a block-copolymer of polyether ester, polyether ester amide or polyether amide.

3. A thermoplastic resin composition as claimed in claim 1 wherein the thermoplastic elastomer of the component (B) is polyetheylene terephthalate-polytetramethylene oxide block-copolymer.

4. A thermoplastic resin composition as claimed in claim 1 wherein the graft-copolymer of the component (C) is acrylonitrile-butadiene-styrene copolymer.

5. A thermoplastic resin composition as claimed in claim 1 wherein the graft-copolymer of the component (C) is methyl methacrylate-butadiene-styrene copolymer.

* * * * *